C. F. BALL.
PORTABLE COT FOR USE WITH AUTOMOBILES.
APPLICATION FILED MAY 4, 1921.
1,401,938.
Patented Dec. 27, 1921.
2 SHEETS—SHEET 2.
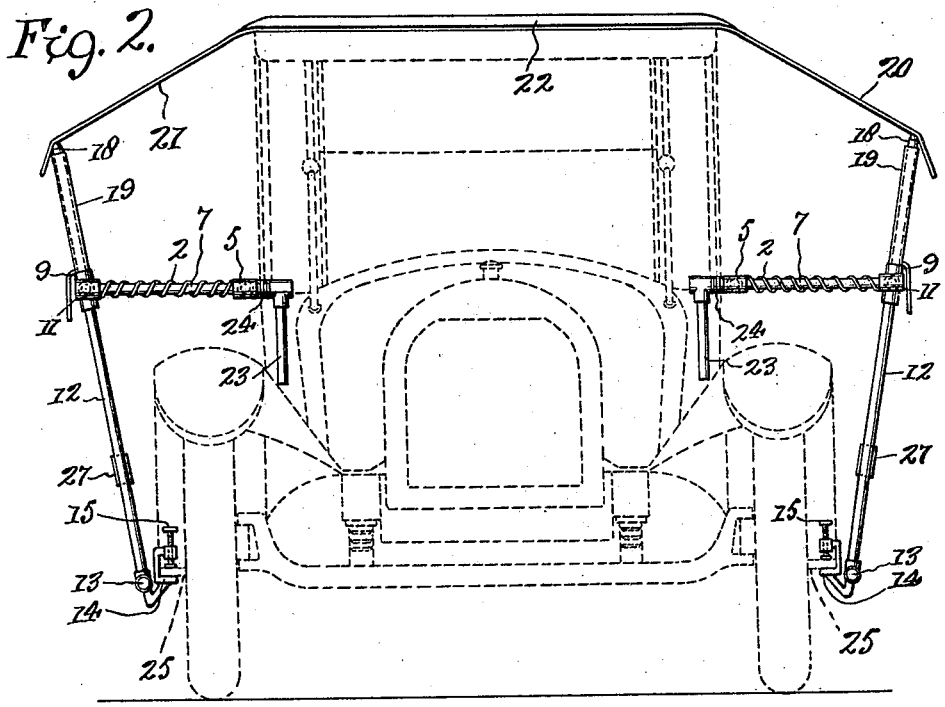
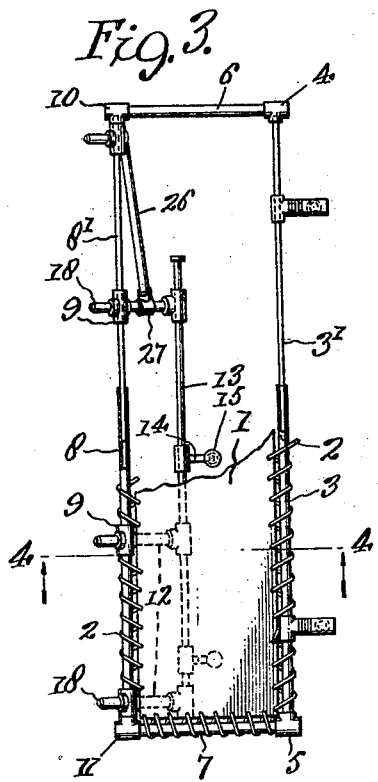
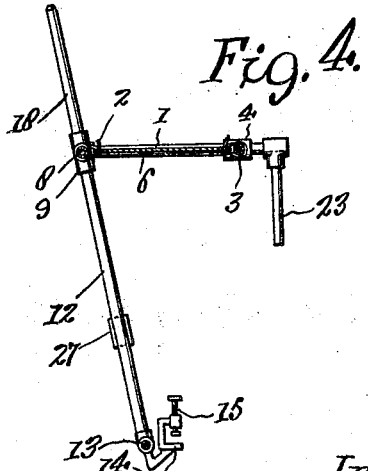
Inventor
Clarence F. Ball.
by Wilkinson & Giusta
Attorneys.

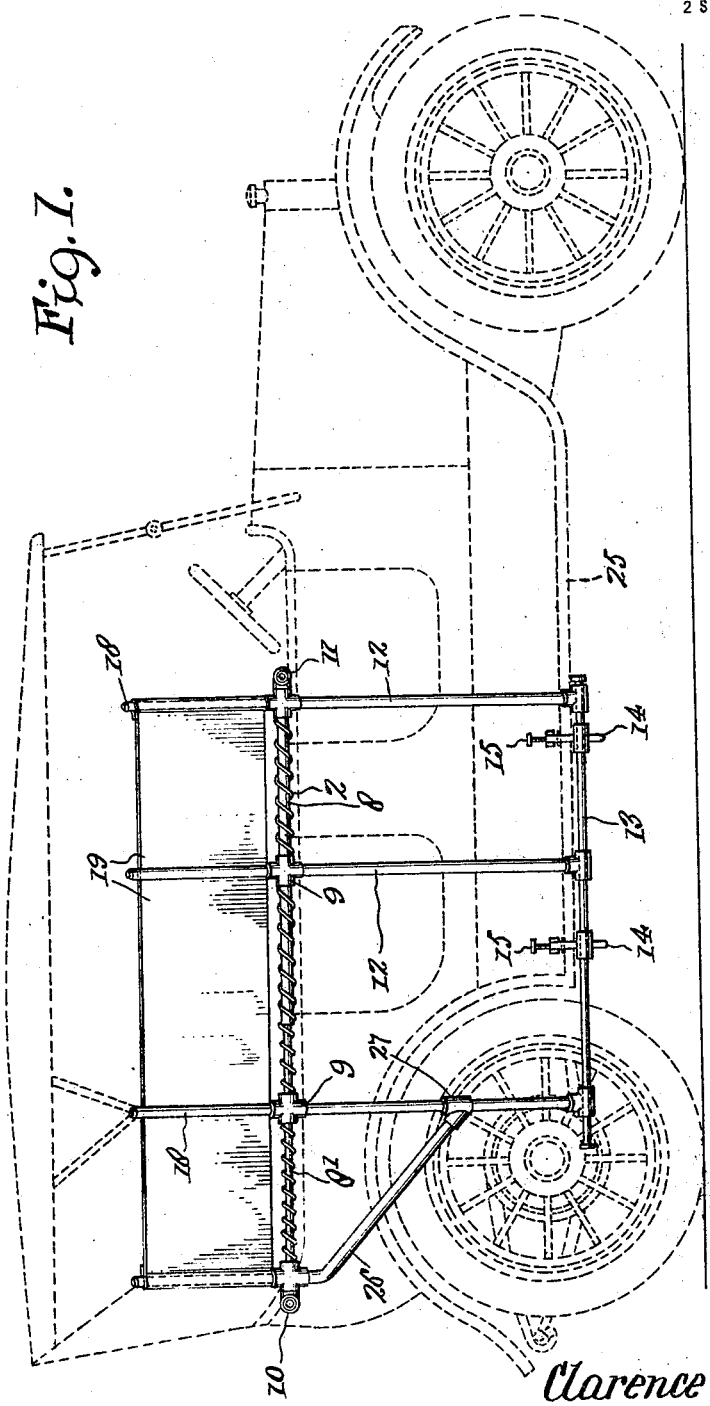

UNITED STATES PATENT OFFICE.

CLARENCE F. BALL, OF RUTLAND, VERMONT.

PORTABLE COT FOR USE WITH AUTOMOBILES.

1,401,938. Specification of Letters Patent. Patented Dec. 27, 1921.

Application filed May 4, 1921. Serial No. 466,804.

*To all whom it may concern:*

Be it known that I, CLARENCE F. BALL, M. D., a citizen of the United States, residing at Rutland, in the county of Rutland and State of Vermont, have invented certain new and useful Improvements in Portable Cots for Use with Automobiles; and I do hereby declare the following to be a full, clear, and exact description of the invention, such as will enable others skilled in the art to which it appertains to make and use the same.

The present invention relates to improvements in portable cots for use with automobiles and the like vehicles, and has for an object to provide a cot for the use of tourists and campers, which is carried outboard of the vehicle and does not encroach on the space between the sides of the vehicle, but which is designed and intended to project beyond the sides of such vehicle and to be used in connection with extension top flaps of the vehicle, or tenting over all, so that the occupant of the cot may be protected from rain, and also fog and mist which are apt to be encountered by tourists and campers.

Another object of the invention resides in providing an adjustable construction of cot capable of being applied to vehicles of different styles and sizes, and which may form a compact article when disassembled, for the purpose of carrying it beneath the rear seat or in a running board box provided therefor.

With the foregoing and other objects in view, the invention will be more fully described hereinafter, and will be more particularly pointed out in the claims appended hereto.

In the drawings, wherein like symbols refer to like or corresponding parts throughout the several views;

Figure 1 shows in dotted lines, a side elevation of an automobile with the improved cot shown in full lines applied thereto;

Fig. 2 is a similar view from the front of the vehicle showing two such cots in full lines;

Fig. 3 is a plan view of the cot with a portion of the fabric removed; and

Fig. 4 is a vertical sectional view taken on the line 4—4 in Fig. 3.

Referring more particularly to the drawing, the improved cot comprises a fabric 1 stretched over a rectangular frame by the use of lacings 2, or other means of attachment. This rectangular frame is preferably constructed of tubular metal or metal piping, and consists of inner rails 3 and 3' which are telescoped together and connected to T-coupling pieces 4 and 5, to which are secured the end bars 6 and 7.

The larger section 3 of piping is preferably a half inch in diameter and approximately four feet in length, while the smaller piece of piping 3' is preferably of substantially three feet in length and is of a size to slidingly fit within the piping 3.

The opposite or outer edge of the cot is comprised of a tubular section 8 of large diameter and a second tubular piece of piping 8' telescoped within the section 8. These may be of similar lengths compared to the telescoped sections 3 and 3' or may be varied in any desired manner. This telescoping arrangement allows of the cot frame being drawn out or collapsed into smaller size as may be desired in connection with the particular type of vehicle on which it is to be used.

On the telescoped pieces of piping 8 and 8' are mounted four-way coupling pieces 9 and end coupling pieces 10 and 11, which latter are employed to join the end bars 6 and 7 to the outer side of the rectangular frame. The lower branches of the coupling pieces 9 are secured to tubular legs 12, which, at their bottom parts, are secured to a tubular rail 13 extending parallel with the running board 25. U-shaped clamps 14 are carried by the rail 13 and have clamping screws 15 adapted to engage the running board.

The upper branches of the coupling pieces 9 removably accommodate posts 18 which extend above the plane of the cot fabric 1, and together with the fabric pieces 19 stretched between the posts, constitute an outer side for the cot. The upper ends of the posts 18 are adapted to receive either the outer portions of side flaps 20 and 21, forming extensions of the top 22 of the vehicle, or outer portions of covering extending from one side to the other over the top of the automobile.

The cot frame is also provided with extension pieces 23, preferably two in number, and extending downwardly and inwardly of the inner rail so as to engage on the inside of the vehicle in sockets, attached to or made in the bottom of the frame for front and rear seats. These extension pieces 23 may be connected with the rail in any suitable manner, but there are preferably a number of lock washers 24 interposed between the frame and the extension pieces in order to compensate for different thicknesses of upholstery.

In use, the cot is adapted to be supported substantially in the manner indicated in Figs. 1 and 2, with the fabric 1 lying substantially flush with the upper edge of the side of the vehicle and outwardly thereof, the legs 12 extend down diagonally with the clamps 14 engaging the running board, which is indicated at 25. The legs are adjustable if desired.

The posts 18 and the fabric 19 stretched thereover, form a side to prevent rolling of the occupant from the cot which is supported at a relatively high elevation, and this side also avoids the penetration of rain or snow to the cot. The flaps 20 and 21 of the top edges of a one piece covering may be provided with suitable turn buttons, glove fasteners, or the like, to secure them to the upper portions of the posts 18 in order that the wind may not blow the flaps or tenting out of position.

As shown more particularly in Fig. 1, a diagonal leg 26 is provided in connection with the rearmost four-way coupling piece, such leg being furnished with a sleeve 27 loosely engaging over the next rearmost leg 12. The legs 12 and 26 slide up and down together, so that the same adjustment is permitted. This construction is made necessary by reasons of the presence of the rear fender.

When not in use, the legs 12 and the posts 18 may be removed from the coupling pieces 9 and the cot, and its pertinent parts may be folded into a flat condition, and if desired, the rectangular frame may be disassembled to enable the whole to be packed within relatively small compass.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A cot for use in connection with vehicles comprising pairs of telescoping side rails adjustably fitted together, end bars connecting the same, a fabric stretched across said telescoping rails and end bars, four-way coupling pieces incorporated in the outer telescoping rails, legs extending downwardly from the lower branches of the four-way coupling pieces, means uniting said legs at their lower portions, a clamp associated with said means and adapted to engage the running board of the vehicle, standards rising from the upper branches of the four-way coupling pieces, a fabric secured to said standards to form a parallel side for the cot, and angled pieces attached to the inner telescoping rails and adapted to fit down within the sides of the vehicle, substantially as described.

2. A cot for use in connection with vehicles comprising extensible side rails, coupling pieces incorporated with the outer side rail and forming parts thereof, legs extending downwardly from the lower branches of the coupling pieces, a rod secured to the lower ends of said legs, a clamp on the rod adapted to removably engage with a portion of the vehicle, posts extending upwardly from the upper branches of the coupling pieces, fabric pieces stretched between the rails and between the posts, connecting bars between the ends of the rails, and angled pieces carried by the inner rails and extending down inwardly of the vehicle and over the side thereof, substantially as described.

CLARENCE F. BALL.